(12) United States Patent
Bender

(10) Patent No.: US 7,024,218 B2
(45) Date of Patent: *Apr. 4, 2006

(54) METHOD AND APPARATUS FOR SUPERVISING TRANSMIT POWER IN A HIGH DATA RATE SYSTEM

(75) Inventor: Paul E. Bender, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 489 days.

This patent is subject to a terminal disclaimer.

(21) Appl. No.: 10/076,147

(22) Filed: Feb. 14, 2002

(65) Prior Publication Data

US 2002/0155852 A1 Oct. 24, 2002

Related U.S. Application Data

(63) Continuation of application No. 09/500,360, filed on Feb. 7, 2000, now Pat. No. 6,377,814.

(51) Int. Cl.
*H04B 7/00* (2006.01)

(52) U.S. Cl. .................. 455/522; 455/422.1
(58) Field of Classification Search ............ 455/572, 455/574, 421, 422.1, 73, 343.5, 522
See application file for complete search history.

(56) References Cited

U.S. PATENT DOCUMENTS

| 4,901,307 | A |   | 2/1990  | Gilhousen et al. ............ 370/18  |
|-----------|---|---|---------|--------------------------------------|
| 5,056,109 | A |   | 10/1991 | Gilhousen et al. ............. 375/1  |
| 5,103,459 | A |   | 4/1992  | Gilhousen et al. ............. 375/1  |
| 5,535,429 | A |   | 7/1996  | Bergenlid et al. .......... 455/53.1  |
| 5,953,677 | A | * | 9/1999  | Sato ........................... 455/574 |
| 6,236,674 | B1| * | 5/2001  | Morelli et al. ............... 455/574 |
| 6,678,508 | B1| * | 1/2004  | Koilpillai et al. ............ 455/137 |
| 2002/0198013 | A1 | * | 12/2002 | Panasik et al. ............. 455/522 |

FOREIGN PATENT DOCUMENTS

EP 0607037 7/1994

* cited by examiner

*Primary Examiner*—David Hudspeth
*Assistant Examiner*—Huy D Nguyen
(74) *Attorney, Agent, or Firm*—Philip Wadsworth; Sandra L. Godsey

(57) ABSTRACT

A method of supervising on the forward link in a high data rate system is disclosed, wherein a base station transmits to an access terminal on a forward traffic channel only when the base station has data to send to the access terminal. Each access terminal generates periodic data rate measurements based on the received forward link signal. Each access terminal then minimizes the period in which it transmits on the reverse link without being power-controlled by turning off its transmitter based on the data rate measurements.

27 Claims, 10 Drawing Sheets

METHOD AND APPARATUS FOR SUPERVISING TRANSMIT POWER IN A HIGH DATA RATE SYSTEM

CROSS REFERENCE

This application is a continuation application of application Ser. No. 09/500,360, now U.S. Pat. No. 6,377,814, filed Feb. 7, 2000, entitled "Method and Apparatus for Supervising Transmit Power in a High Data Rate System" and currently assigned to the assignee of the present application.

BACKGROUND OF THE INVENTION

I. Field of the Invention

The current invention relates to wireless communication. More particularly, the present invention relates to a novel and improved method and apparatus for controlling reverse link transmit power in a wireless communication system.

II. Description of the Related Art

A modern day communication system is required to support a variety of applications. One such communication system is a code division multiple access (CDMA) system which conforms to the "TIA/EIA-95A Mobile Station-Base Station Compatibility Standard for Dual-Mode Wideband Spread Spectrum Cellular System", hereinafter referred to as the IS-95 standard. A system operating in accordance with the IS-95 standard is referred to herein as an IS-95 system. The CDMA system allows for voice and data communications between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present invention and incorporated by reference herein. Power control techniques in a CDMA multiple access communication system are disclosed in U.S. Pat. No. 5,056,109, entitled. "METHOD AND APPARATUS FOR CONTROLLING TRANSMISSION POWER IN A CDMA CELLULAR TELEPHONE SYSTEM," as well as in IS-95, and are well known in the art.

The term "base station" is used to refer to the hardware with which the subscriber stations communicate. The term "cell" refers to a geographic coverage area within which subscriber stations may communicate with a particular base station. Consequently, as a subscriber station moves from outside the coverage area of a base station towards the base station, the subscriber station eventually moves into the "base station's cell." Each base station is typically located near the center of its cell. In a simple configuration, a base station transmits signals using a single carrier frequency to an entire cell. In order to increase call capacity, an additional base station may be installed at the same location to provide coverage within the same cell at a different carrier frequency. To increase capacity even further, a cell may be divided into radial regions much like pie slices. In this way, a cell may be "sectorized", with each base station transmitting through directional antennas that cover only a portion of a cell. In the most common configuration, a cell is divided into three regions called sectors, with each sector covering a different 120-degree section of the cell. Each base station in a sectorized cell transmits at a single carrier within a single sector or within a single unsectorized cell.

In a CDMA system, a subscriber station communicates with a data network by transmitting data on the reverse link to a base station. The base station receives the data and can route the data to the data network. Data from the data network is transmitted on the forward link of the same base station to the subscriber station. The forward link refers to transmission from the base station to a subscriber station and the reverse link refers to transmission from the subscriber station to a base station. In IS-95 systems, separate frequencies are allocated for the forward link and the reverse link.

IS-95 systems utilize a plurality of different types of communication channels, including pilot, paging, and forward traffic channels. The availability of forward traffic channel resources determines how many different subscriber station calls can be supported by each base station. In order to maximize connection capacity, connection supervision techniques have been developed to free up traffic channel resources quickly and to prevent a subscriber station from acting as an in-band jammer should its traffic channel be lost unexpectedly. Such an unexpected call drop could result from movement of the subscriber station either out of coverage of a base station or through a tunnel that causes the loss of the traffic channel signal.

Traffic channel supervision in IS-95 includes two mechanisms, herein referred to as jammer prevention procedure and traffic channel recovery procedure. The jammer prevention procedure specifies the conditions under which a subscriber station must stop transmitting a reverse link signal. This procedure limits the length of time during which a subscriber station transmits a reverse link signal without being power-controlled by the base station. The traffic channel recovery procedure specifies the conditions under which a subscriber station will declare a loss of the traffic channel, ending the call. This second procedure allows the base station to reclaim and reuse a traffic channel when communication is suddenly lost to a subscriber station.

In IS-95, the jammer prevention procedure dictates that a subscriber station cease transmissions when it is not receiving a strong enough forward link signal to ensure good reverse link power control. If the subscriber station receives a specified number of consecutive erased frames (generally 12 frames), the subscriber turns off its transmitter. The transmitter may be turned back on after the subscriber station receives a specified number of good frames, such as 2 or 3.

In IS-95 the traffic channel recovery procedure dictates that a subscriber station whose transmitter has been turned off in accordance with the jammer prevention procedure for a specified supervision time must declare its traffic channel lost. The supervision time for the traffic channel recovery procedure is typically around five seconds. Similarly, if the base station detects that a call with a subscriber station is no longer active, the base station will declare the traffic channel lost.

The above-described method allows recovery of traffic channel resources after a relatively short (five seconds) supervision time. One reason that this method works in an IS-95 system is that the base station continuously transmits new frames of information to each active subscriber station every 20 milliseconds, allowing the subscriber station to supervise on this continuous forward traffic stream. This approach is far less effective in a high data rate (HDR) system in which a base station transmits to a subscriber station only when the base station has data to send.

An exemplary HDR system for transmitting high rate digital data in a wireless communication system is disclosed in U.S. patent application Ser. No. 08/963,386, now U.S. Pat. No. 6,574,211, issued on Jun. 3, 2003 to Padovani et al., entitled "METHOD AND APPARATUS FOR HIGHER RATE PACKET DATA TRANSMISSION" (hereafter the '386 application), assigned to the assignee of the present application and incorporated by reference herein. As described in the '386 application, a base station transmits information to one subscriber station at a time, with the transmission rate depending on carrier-to-interference (C/I) measurements collected by the subscriber station. A subscriber station has only one connection with the base station, but that connection may comprise multiple traffic channels. The base station transmits information frames to a particular subscriber station only when the base station has data to send to that subscriber station. Thus, a subscriber station may maintain a connection with a base station on multiple traffic channels for a long period of time without receiving a frame of data from the base station.

In a system using such a transmit approach, a jammer prevention procedure could not rely on erasure rates, because the subscriber station cannot distinguish between receiving an erasure and not being sent a data frame. In addition, the supervision time necessary to reclaim traffic channel resources such a system would be less predictable and could far exceed five seconds. Methods of jammer prevention and of reducing supervision time in an HDR system are therefore highly desirable.

SUMMARY OF THE INVENTION

The present invention is directed to a novel and improved method and apparatus for high data rate wireless systems wherein data is transmitted according to the demands of a packet data network. The capacity of the wireless system is improved by controlling the amount of time that an access terminal may transmit on the reverse link without being reliably power-controlled.

In one aspect of the invention, in order to minimize reverse link jamming, each access terminal generates data rate control (DRC) values and monitors those generated DRC values. The DRC values vary according to carrier-to-interference (C/I) measurements made by the access terminal. When the C/I values measured at the access terminal fail to meet specified criteria, the access terminal generates a zero-rate DRC value indicating that the access terminal cannot decode forward link data at all. A DRC level of zero can also indicate that the access terminal is no longer within range of the base station, and is therefore no longer being effectively power controlled. When the DRC level remains at zero for a prolonged period, the access terminal turns off its transmitter to avoid becoming an uncontrolled in-band jammer. In an exemplary embodiment, the access terminal turns off its transmitter if the DRC level remains continuously at zero-rate for a "Turn-Off" period of approximately 240 milliseconds. The access terminal turns its transmitter back on after its DRC rate stays continuously above zero for a "Turn-On" period, for example 13.33 or 26.67 milliseconds.

In another aspect of the invention, a wireless network communicates with an access terminal through a connection comprising one or more traffic channels. Each of the one or more traffic channels is allocated from a different base station belonging to the wireless network. The wireless network initiates the release of a connection with an access terminal by sending a release initiate message to the access terminal. The access terminal responds by sending a release message and then terminating its use of all traffic channels. In the event that the release initiate message or the release message is lost to communication error, the base station and access terminals use a traffic channel recovery procedure to limit the length of the supervision time. Minimizing the supervision time allows quick reclaiming and reuse of traffic channel resources by the base station.

In an exemplary embodiment, a wireless network controls supervision time by maintaining a minimum data frame transmission rate to each access terminal in the system. For example, if a maximum-zero-traffic period elapses without a data frame being sent to an access terminal, the wireless network transmits a null data frame to the subscriber station. If an access terminal does not successfully decode any data frame or null data frame on any of its traffic channels for a specified number maximum-zero-traffic periods, the access terminal declares a loss of its connection with the base station and stops transmitting. If the wireless system does not receive a release message after sending a release initiate message, it stops sending the data frames and null data frames to the access terminal. After a specified number of maximum-zero-traffic periods elapse, the wireless system reclaims the traffic channel resources allocated to the released access terminal.

In an advantageous embodiment, each base station of the wireless network instead controls supervision time by broadcasting a configuration packet to all active access terminals served by a base station. The configuration packet includes traffic channel allocation information indicating whether each of the base station's traffic channels is allocated to an active access terminal. If an access terminal decodes a configuration packet indicating that one of its traffic channels has been deallocated, then the access terminal releases the traffic channel and optionally its connection with the wireless network. If the access terminal fails to successfully decode at least one configuration message for the duration of the supervision time, then the access terminal releases its traffic channels and its connection with the wireless network.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF PREFERRED EMBODIMENTS

Figure 1:
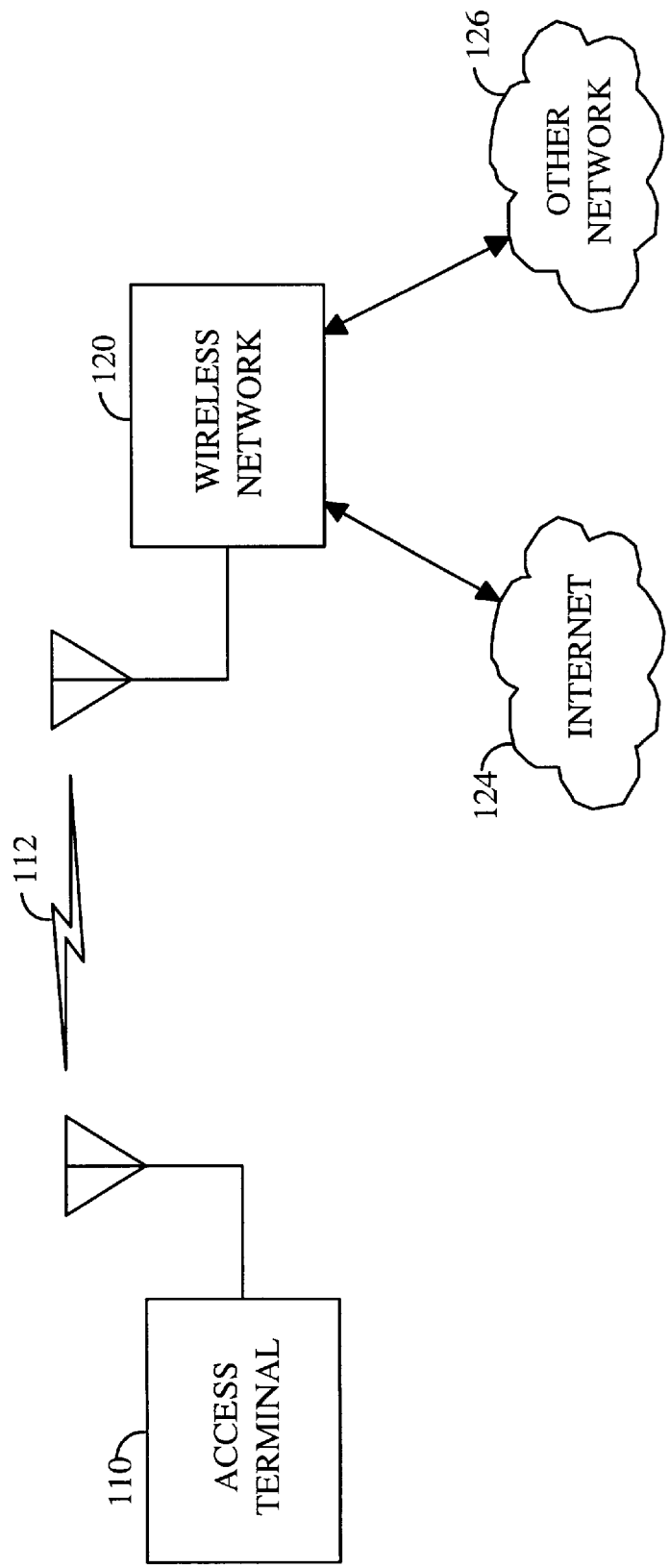
FIG. 1 is a diagram of an exemplary high data rate wireless system.

FIG. 1 is a block diagram of an exemplary embodiment of a wireless high data rate (HDR) subscriber station 110, hereafter called an access terminal, in communication with a high data rate wireless network 120. Access terminal 110 communicates through wireless network 120 to exchange packet data with the Internet 124 or some other packet data network 126, such as a closed network such as a corporate network. Examples of packet data include Internet Protocol (IP) datagrams used for such applications as accessing web pages and retrieving e-mail. Such packet data applications may run directly on access terminal 110, or may run on a separate computer device that uses access terminal 110 as a wireless modem. In an exemplary embodiment, access terminal 110 communicates with wireless network 120 through wireless communication channel 112.

Wireless network 120 may consist of a single base station and base station controller, or may include a plurality of separately located wireless base stations and a base station controller connected together in a network. Each base station has a predetermined number of traffic channels that it can use to exchange data with access terminals. When one of the traffic channels is assigned to an access terminal, that access terminal is referred to as an active access terminal. At least one traffic channel is assigned to each active access terminal. Wireless network 120 can be connected with packet data network 126 using any appropriate type of network connection such as wireless or wire-line T1 or T3, fiber optic connection, or ethernet. Wireless network 120 may be connected to multiple packet data networks having more than one type. For example, another network 126 might be a public switched telephone network (PSTN) connected with wireless network 120 through a data services interworking function (IWF).

In an exemplary embodiment, an access terminal 110 continuously monitors transmissions from wireless network 120 in order to estimate the carrier-to-interference (C/I) ratio of the channel. Access terminal 110 periodically sends a data rate control (DRC) signal to wireless network 120 indicating the greatest data rate at which the access terminal 110 can receive data based on previous C/I measurements of wireless communication channel 112. The C/I for an access terminal 110 and its associated DRC signal will vary due to such conditions as changes in the position of the access terminal 110. When an access terminal 110 can receive data at a high rate, it sends a DRC signal having a high value. When an access terminal 110 can receive data at a low rate, it sends a DRC signal having a low value.

In an exemplary system, a base station in wireless network 120 uses the full capacity of its forward traffic channel to transmit data to a destination access terminal. The base station sends data to only one access terminal 110 at a time, and transmits the data at generally the highest rate allowable as indicated by the DRC signal received from the destination access terminal. The transmissions are encoded such that they can only be correctly decoded by the destination access terminal.

In an exemplary system, wireless network 120 maintains a forward link data queue for each active access terminal 110. Whenever wireless network 120 receives data from packet data network 126 addressed to an access terminal, it places the data into the corresponding forward link data queue.

Forward link transmissions are divided into slots of 1.667 milliseconds in duration, or 600 slots per second. A base station transmits data to only one destination access terminal during a slot, and transmits data at a rate based on DRC information received from the destination access terminal. Any time a base station selects a new destination access terminal, it sends an entire "encoder packet" having a predetermined minimum size. In the exemplary embodiment, the minimum encoder packet size is 1024 bits. If the minimum encoder packet cannot be transmitted at the requested DRC rate within a single slot, the base station transmits the encoder packet to the destination access terminal in multiple consecutive slots. For example, in order to send 1024 bits at a rate of 38.4 kbps, the base station transmits the encoder packet over 16 consecutive slots.

In the exemplary system, a base station only transmits an encoder packet to an access terminal if the forward link data queue is not empty. If packet data network 126 does not send data to an access terminal, and the forward link data queue for that access terminal is empty, then the base station will not transmit encoder packets to the access terminal.

In many popular packet data applications, such as web browsing, the information exchanged between a network and a network node is bursty. In other words, the demand for bandwidth may experience short peaks, between which the demand for bandwidth is very low. Web page browsing is a good example of a bursty packet data application. A user may access the Internet using a laptop computer connected to an access terminal. While the user downloads a web page, the web browser application will demand all the bandwidth possible from the network. After the download is complete, the demand for bandwidth will drop to zero as the user reads the web page. If the user needs no more information, he may close the web browsing application, or may simply leave the computer idle.

In an exemplary system, wireless network 120 monitors the length of time that each active access terminal remains idle (does not transmit or receive data). After the expiration of an idle timer, wireless network 120 sends a release initiate message on the forward link to the access terminal in order to reclaim the associated traffic channel resources for use by other access terminals that are not idle. The access terminal responds by sending a release message to the wireless network 120 and releasing its connection with the wireless network 120 and the traffic channels associated with the connection. The release initiate message and the release message, like any other messages, are subject to communication error. If an access terminal does not successfully decode a release initiate message, the access terminal may not know that it has been released. Likewise, if the wireless network 120 does not receive a successfully decoded release message, it may not know that the associated traffic channel resources are available for assignment to other access terminals. To allow timely reclaiming and reuse of traffic channel resources in the face of such communication errors, an exemplary HDR system utilizes a connection supervision procedure.

The exemplary HDR system differs from IS-95 in that it only sends forward link traffic data to an access terminal if the associated forward link data queue is not empty. The potential for long periods of zero traffic channel activity combined with the possibility of lost release initiate or release messages complicate connection supervision procedures in an HDR system.

In an exemplary embodiment, an access terminal computes a DRC signal level for every time slot. The jammer prevention procedure specifies that the access terminal must turn off its transmitter after its DRC level drops to zero-rate for a specified duration, for example 240 milliseconds or 144 time slots. The access terminal turns its transmitter back on after its DRC rate stays above zero for a specified period, for example 8 consecutive time slots or 13.33 milliseconds. In an alternate embodiment, this latter period is 16 consecutive time slots or 26.67 milliseconds.

In one embodiment, connection state mismatches are avoided by specifying a maximum-zero-traffic period that may pass without transmitting information to each access terminal. If the forward link data queue for an access terminal remains empty such that the maximum-zero-traffic period might elapse without sending a data packet to the access terminal, wireless network 120 transmits a "null data packet" to the access terminal. The supervisory period is at least twice as long as the maximum-zero-traffic period, to allow the access terminal to lose (due to communication error) a few null data packets without immediately releasing its connection.

One problem with transmitting null traffic data is that it may substantially degrade the average forward link throughput of an HDR base station. This is especially true when transmitting null traffic data to an access terminal at a low data rate. For example, sending null traffic data in a 1024-bit encoder packet at 38.4 kbps might consume 16 consecutive forward link transmit slots. If there are many such access terminals, this kind of connection supervision procedure becomes very expensive in terms of forward link bandwidth.

Also, even if the length of the maximum-zero-traffic period is lengthened to avoid wasting too much bandwidth on null traffic data, the connection supervision period becomes long. For example, if the maximum-zero-traffic period is set to 15 seconds, then the connection supervision time may be 60 seconds. This means that if wireless network 120 does not receive a release message from an access terminal, the wireless network 120 might have to wait 60 seconds before reclaiming and reallocating the associated traffic channel resources. Tying up traffic channel resources for such a long period is highly undesirable.

In an advantageous embodiment, each base station periodically transmits a configuration packet on a broadcast control channel to all its active access terminals. The configuration packet includes traffic channel allocation information indicating whether each traffic channel is allocated to an active access terminal. An active access terminal being served by the base station checks each successfully decoded configuration packet to determine the state of a traffic channel that is allocated to the access terminal. If the state of a traffic channel changes from allocated to unallocated, then that traffic channel has been deallocated and may be reassigned to another access terminal. Once the access terminal determines that one of its corresponding traffic channels has been deallocated, then the access terminal immediately releases and stops using that traffic channel. In an exemplary embodiment, the access terminal continues to use traffic channels still allocated to the access terminal by other base stations. In another embodiment, the deallocation of any of an access terminal's traffic channels prompts the access terminal to release its connections with all base stations and the associated traffic channels. Additionally, if an access terminal fails to successfully decode a configuration packet within the connection supervision time, then it immediately releases its connection with the wireless network, including any associated traffic channels, and stops transmitting.

In an exemplary embodiment, an access terminal maintains separate supervision timers for each base station serving the access terminal. When the access terminal fails to successfully decode a configuration packet from a particular base station, then the access terminal releases the traffic channel associated with that base station. If the access terminal continues to successfully decode configuration packets from another base station, and those configuration packets indicate that the other base station has not deallocated the access terminal's traffic channel, then the access terminal will continue to use the traffic channel of the other base station.

In an advantageous embodiment, the configuration packet is broadcast frequently enough that the supervision time can be comparable to the supervision time used in IS-95. For example, where the configuration packet is broadcast every 400 milliseconds, an access terminal releases its connection after not decoding the configuration packet for a supervision time of 4.8 seconds or 12 consecutive lost configuration packets. One skilled in the art will recognize that one may vary the timing associated with transmissions of the configuration packet containing traffic channel allocation information without departing from the method described herein. Similarly, one may vary the supervision time without departing from the method described herein.

In an exemplary embodiment, the traffic channel allocation information in each configuration packet is a bit mask having the same number of bits as the maximum number of forward traffic channels supported by the base station. Each active access terminal knows which bit in the bit mask corresponds to the access terminal's traffic channel, and ignores the state of other bits in the bit mask. In an exemplary embodiment, a '1' is used to denote that a traffic channel is allocated, and a '0' is used to denote that a traffic channel is deallocated or unallocated. In an exemplary embodiment, each base station can support a maximum of 28 forward link traffic channels, and the length of the bit mask is 28 bits. In an alternate embodiment, each base station can support a maximum of 29 forward link traffic channels, and the length of the bit mask is 29 bits. One skilled in the art will recognize that this number of traffic channels represented and bits may be varied without departing from the method described herein.

Upon successfully decoding a configuration packet, each active access terminal inspects the bits corresponding to the forward traffic channels allocated to it. If the forward traffic channel allocation bits indicate that the access terminal's traffic channel has been deallocated, the access terminal releases that traffic channel and optionally its entire connection with the wireless network 120.

When terminating a connection between the wireless network 120 and an access terminal, one base station within wireless network 120 first sends a release initiate message to the access terminal. Upon receiving a release initiate message, the access terminal responds by sending a release message through the base station to wireless network 120. If either the release initiate message or the release message is lost to communication error, the wireless network 120 does not receive the release message. The connection supervision procedure advantageously changes the periodic configuration packet broadcast by the base station after sending a release initiate message and failing to decode a corresponding release message. The configuration packet for one or all base stations serving the to-be-released access terminal are changed to indicate the deallocation of the traffic channels associated with the access terminal. After the expiration of the supervision time, the base stations reclaim the traffic channel resources, which are subsequently made available for assignment to other access terminals. Data received from the to-be-released access terminal through traffic channels after the traffic channels have been marked as deallocated in the configuration packet but before the expiration of the supervision period may optionally be routed by the base station.

Figure 2A:
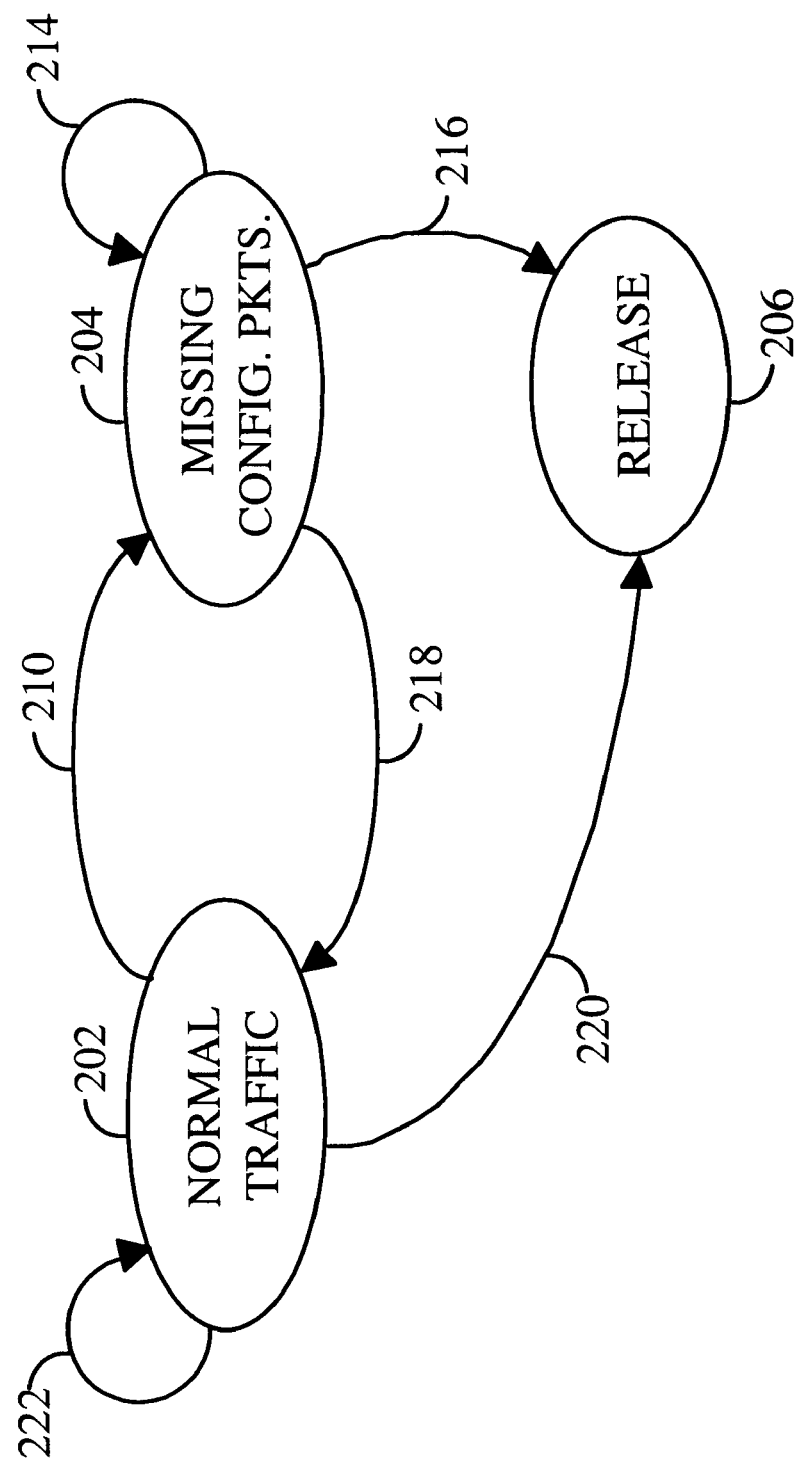
FIG. 2a is an exemplary state diagram for processing supervision time in the access terminal.

FIG. 2a is an exemplary state diagram for processing supervision time in access terminal 110 of FIG. 1. During the Normal Traffic State 202, the access terminal transmits normally on the reverse link while monitoring forward link transmissions from its serving base station. The access terminal keeps track of slot timing to identify the slots that should contain the configuration packet with the traffic channel allocation information for at least one of its serving base stations.

If the access terminal receives a release initiate message or decodes a configuration packet indicating the deallocation of one of its traffic channels, the access terminal transitions 220 from the Normal Traffic State 202 to the Release State 206. In an exemplary embodiment, the release initiate message is received on the forward traffic channel or the forward link control channel, and the configuration packet is received as a broadcast on the forward link control channel. Only one of the above events is required for the access terminal to transition 220 to the Release State 206. For example, the access terminal will release the traffic channel after decoding a configuration packet indicating the deallocation of its traffic channel, even though it received no release initiate message. Once in the Release State 206, the access terminal ceases transmissions on the reverse link and stops decoding the forward traffic channel.

As mentioned above, an alternate embodiment allows the access terminal to remain in the Normal Traffic State 202 upon receiving a configuration packet indicating deallocation of one, but not all, of its traffic channels. In this embodiment, a configuration packet will cause the access terminal to transition 220 to the Release State 206 only if the access terminal's last and only traffic channel has been deallocated, leaving no traffic channels allocated for a connection.

In an alternative embodiment, the release initiate message is never sent, and the wireless network always releases the access terminal using the traffic channel allocation information in the configuration messages broadcast by its base stations. This approach enables even greater efficiency of forward link bandwidth, saving the slots that would otherwise be consumed transmitting release initiate messages on the forward link. One disadvantage of this approach is that traffic channel resources associated with a dropped access terminal may never be reclaimed and reassigned to another access terminal until the expiration of the supervision time.

As mentioned above, the access terminal periodically tries to decode the configuration message on the forward link while in the Normal Traffic State 202. If the access terminal decodes a configuration packet indicating that its traffic channels are still allocated, the access terminal remains in the Normal Traffic State 202, as indicated by state transition 222.

If the access terminal fails to successfully decode a configuration packet during a period when the configuration packet is transmitted by the base station, the access terminal transitions 210 to the Missing Configuration Packets State 204. If the access terminal then successfully decodes a subsequent configuration packet, it transitions 218 back to the Normal Traffic state 202.

Each time the access terminal first enters the Missing Configuration Packets State 204, the access terminal begins tracking the length of time that passes without successful decoding of a configuration packet. If that time exceeds the supervision time, then the access terminal transitions 216 to the Release State 206. Before the expiration of the supervision time, subsequent failures to decode a configuration packet causes the access terminal to remain in the Missing Configuration Packets State 204, as indicated by state transition 214.

Figure 2B:
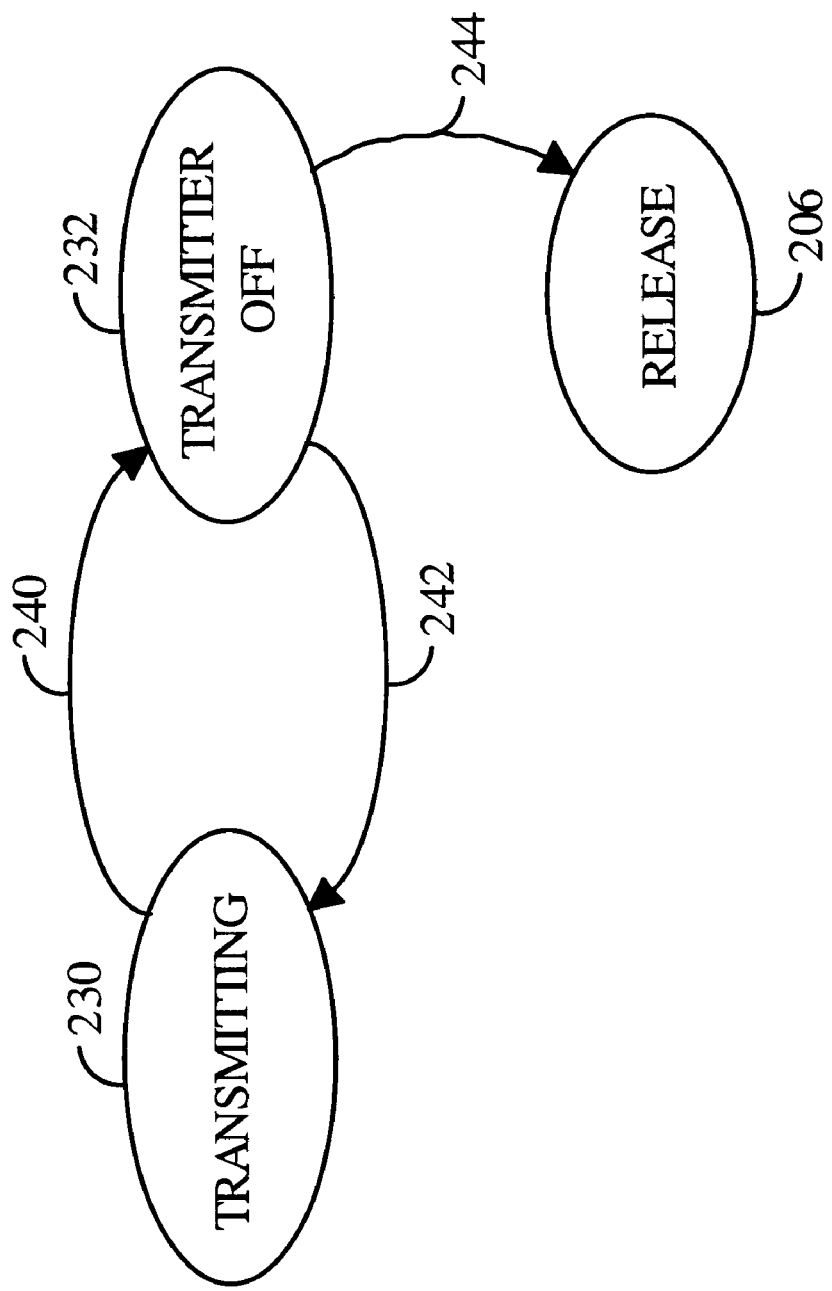
FIG. 2b is an exemplary state diagram for a jammer prevention procedure in the access terminal.

FIG. 2b is an exemplary state diagram for a jammer prevention procedure in access terminal 110 of FIG. 1. In an exemplary embodiment, the access terminal remains predominately in a Transmitting State 230, wherein the access terminal continuously transmits a signal to one or more serving base stations on the reverse link. In the Transmitting State 230, the access terminal continuously generates a DRC signal on the reverse link until the DRC signal remains at a zero-rate level for a specified period. If the access terminal generates a zero-rate DRC signal for a specified number of consecutive time slots, the access terminal turns off its transmitter and transitions 240 to the Transmitter Off State 232. In the Transmitter Off State 232, the access terminal continues to monitor the C/I of the forward link and continues to generate a DRC measurement for each time slot. If the DRC measurement rises above zero-rate for a predetermined number of time slots, for example 8, the access terminal turns on its transmitter and transitions 242 back into the Transmitting State 230. During the Transmitting State 230 and the Transmitter Off State 232, any data successfully decoded on the forward link is routed by the access terminal as normal. While the access terminal is in the Transmitter Off State 232, however, the access terminal transmits no data on the reverse link.

In an exemplary embodiment, if the access terminal remains in the Transmitter Off State 232 for a specified amount of time, for example the supervision time or 4.8 seconds, the access terminal transitions 244 into the Release State 206 described above. One skilled in the art will appreciate that the timeout for performing transition 244 may be different from the supervision time without departing from the methods described herein.

Figure 3A:
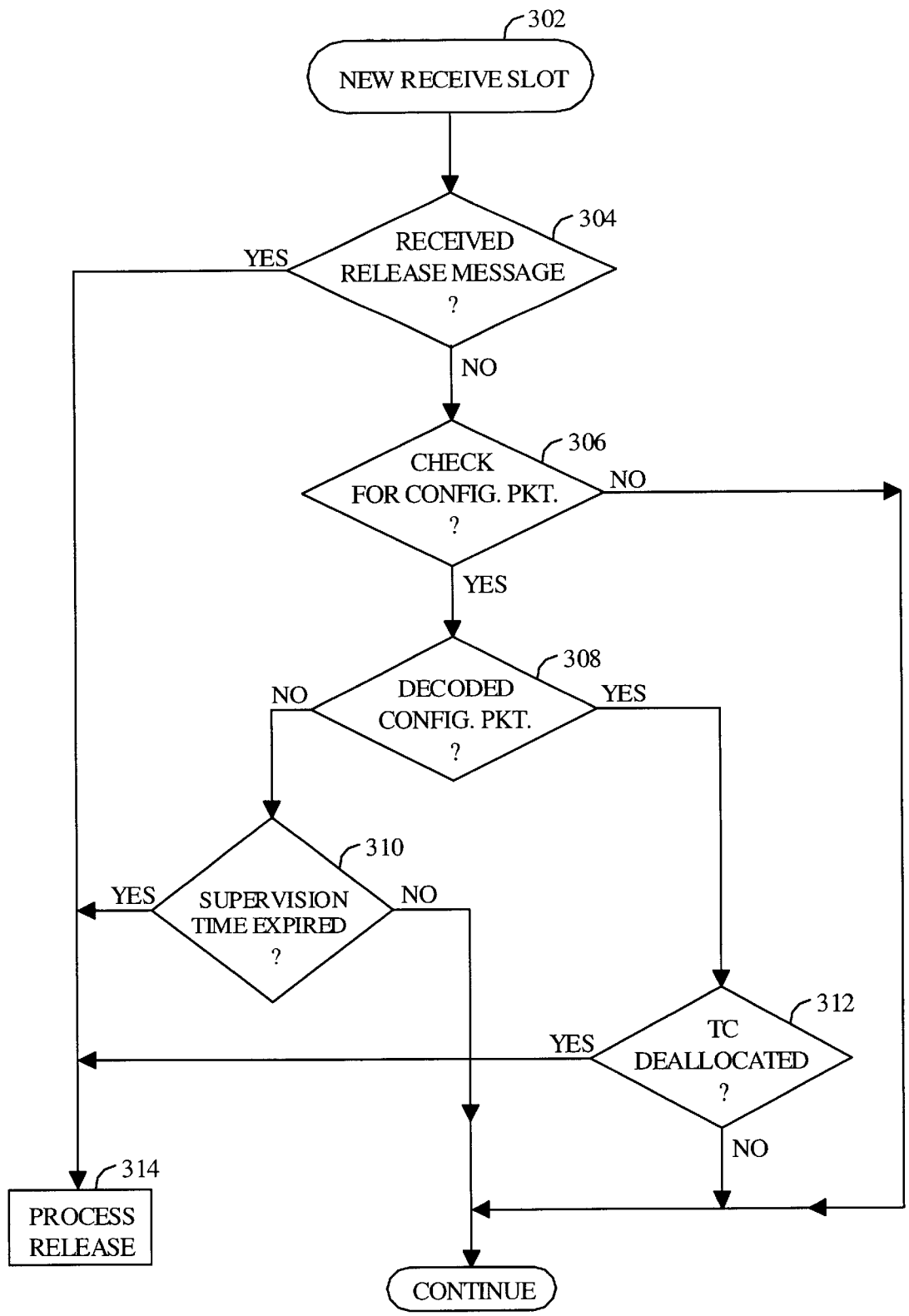
FIG. 3a is an exemplary flowchart of supervision time processing in the access terminal.

FIG. 3a is an exemplary flowchart of supervision time processing in an access terminal. For every new forward link time slot 302, the access terminal (304) evaluates what was or was not received on both the forward link broadcast control channel and the forward traffic channel assigned to the access terminal. Based on what is or is not decoded from the forward link, the access terminal either processes a release 314 or continues to process the next forward link time slot.

If a release initiate message is decoded during a time slot 304, the access terminal immediately processes a release 314. If a release initiate message is not received, then the access terminal determines 306 whether the time slot being processed is one during which the last portion of a complete configuration packet was expected. In an exemplary embodiment, the configuration packet is sent at constant intervals measured in slots. For example, in a system using 1.667 millisecond time slots, the configuration packet could be sent every 400 milliseconds, or once every 240 time slots. At step 306, the access terminal checks whether the forward link transmit slot being evaluated is one in which a complete configuration packet should have been received. If the forward link transmit slot does not fall at the end of one of these intervals, then the access terminal does not need to look for a successfully decoded configuration packet, and may proceed to process the next slot.

If the access terminal determines 306 that it should have received a complete configuration packet, the access terminal then checks 308 whether a configuration packet was successfully decoded. If a configuration packet was not successfully decoded, then the access terminal checks 310 how long it has been since the last successful decoding of a configuration packet. If the period between the current time slot and the last successful decoding of a configuration packet is greater than or equal to the supervision time, the access terminal declares its connection with the wireless network lost and processes a release 314. If the period between the current time slot and the last successful decoding of a configuration packet is less than the supervision time, the access terminal continues on with processing for the next slot.

When the access terminal determines that a configuration packet was successfully decoded at step 308, it extracts and inspects the traffic channel allocation information contained in the configuration packet to determine 312 whether a traffic channel assigned to the access terminal has been deallocated. If the access terminal's traffic channel has been deallocated, then the access terminal processes a release 314. If the access terminal may still use other traffic channels that have not been deallocated, then the access terminal optionally processes a release 314 only for the newly-released traffic channel and continues to use the remaining traffic channels. If the configuration packet indicates that the traffic channel remains allocated to the access terminal, then the access terminal continues on with processing for the next slot.

Figure 3B:
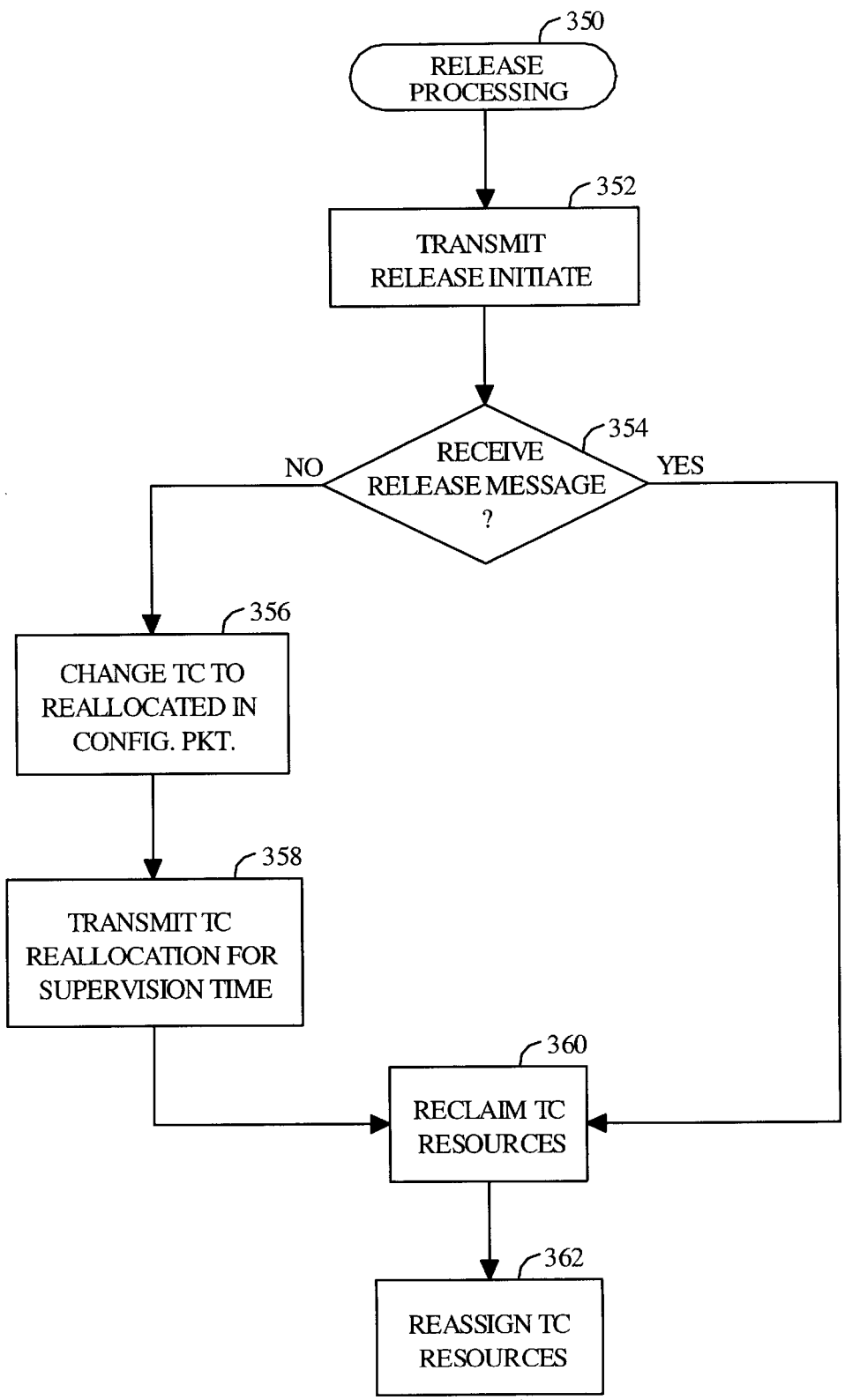
FIG. 3b is an exemplary flowchart of supervision time processing in the wireless network.

FIG. 3b is an exemplary flowchart of supervision time processing in a wireless network. Upon initiating 350 the release processing of an access terminal, the wireless network sends a release initiate message 352 to the access terminal. At step 354, the wireless network evaluates whether it has received a release message from the access terminal. If the wireless network receives a release message from the access terminal, then it immediately reclaims the traffic channel resources 360 previously allocated to the now dropped access terminal.

If the wireless network does not receive a release message at step 354, then the wireless network causes a change in the traffic channel allocation information 356 in configuration packets transmitted by the wireless network's base stations. The traffic channel allocation information is updated to indicate that the traffic channels previously allocated to the to-be-released access terminal has been deallocated.

In an exemplary embodiment, the access terminal will not transmit any acknowledgment or response for a decoded configuration packet that causes a release. The access terminal simply stops transmitting and receiving on the specified traffic channels. Consequently, the wireless network cannot know when or whether the access terminal has decoded the configuration packet. Thus, the wireless network may not reclaim the traffic channel resources associated with that access terminal until after waiting the duration of the supervision period.

After changing the information transmitted in the configuration packet 356, the base station continues to periodically transmit 358 the modified configuration packets for the duration of the supervision time. After the supervision time expires, the wireless network reclaims 360 the traffic channel resources previously allocated to the now-released access terminal. After the traffic channel resources have been reclaimed 360, then the reclaimed traffic channels and their associated resources may be reassigned at step 362.

Though shown as sequential steps, the transmitting of the release initiate message 352 and the changing of the configuration packet 356 may be done in either order, or may be done at approximately the same time. If the changed configuration packet and a release initiate message are received at the same time, the access terminal transmits the release message in response to the release initiate message before reacting to the received configuration packet.

Figure 4A:
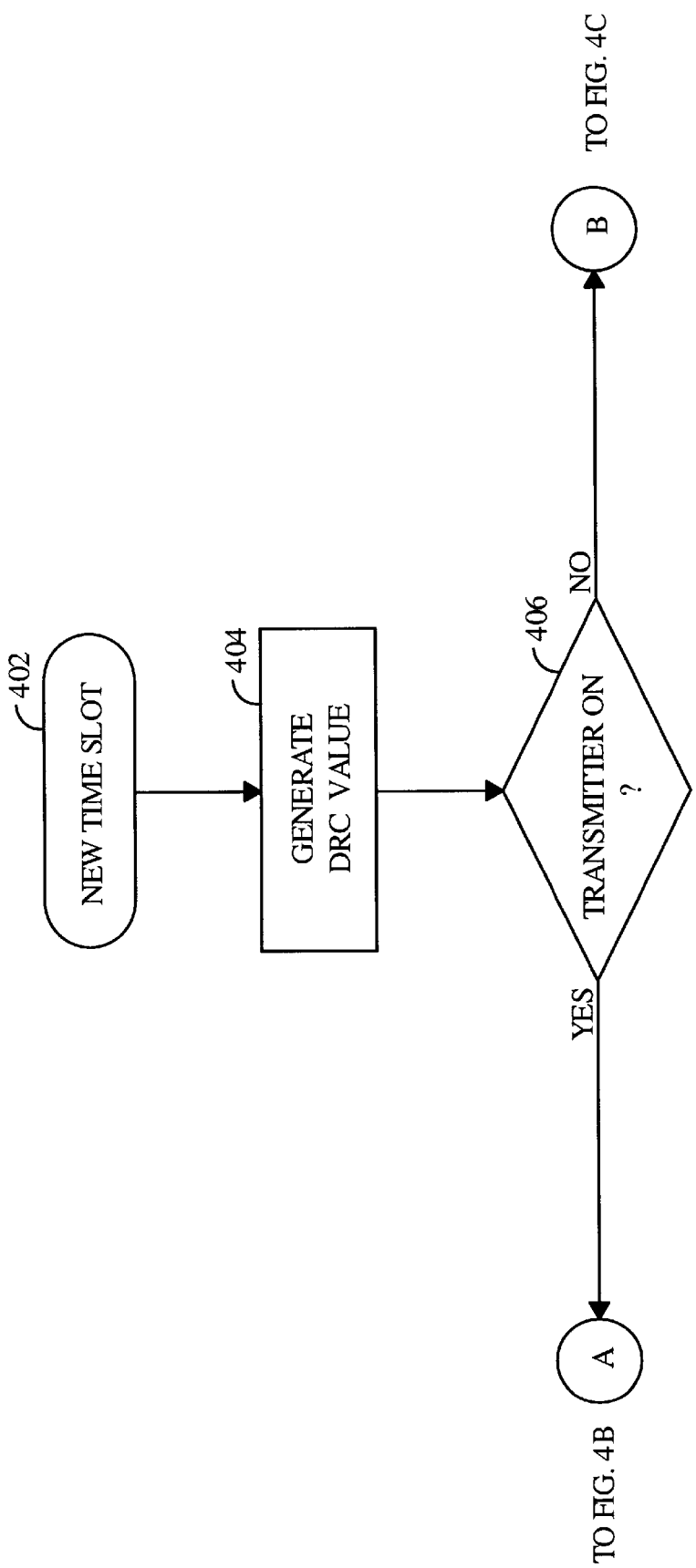
FIGS. 4a–4c are flowcharts of an exemplary process for supervising transmit power.
Figure 4B:
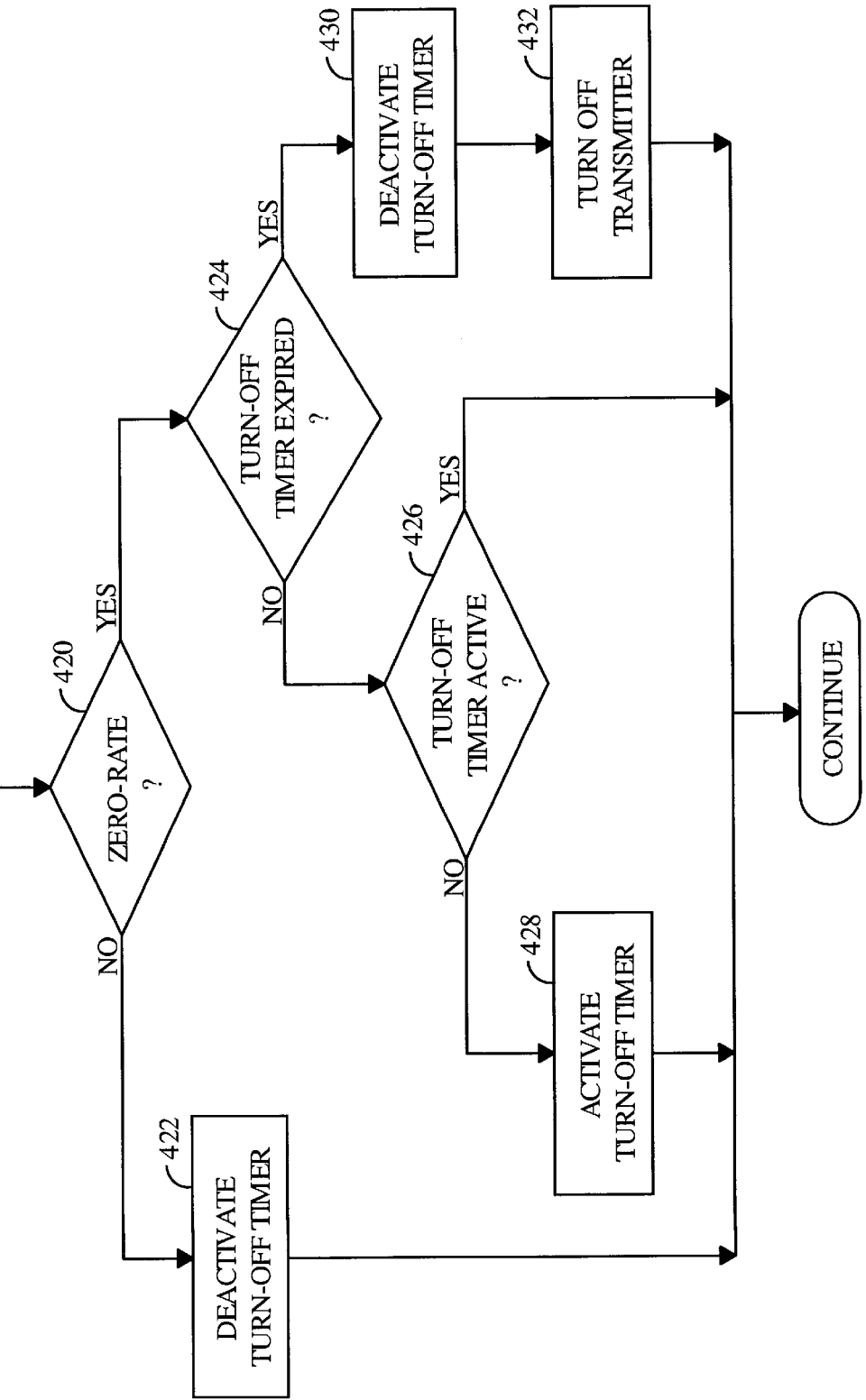
Figure 4C:
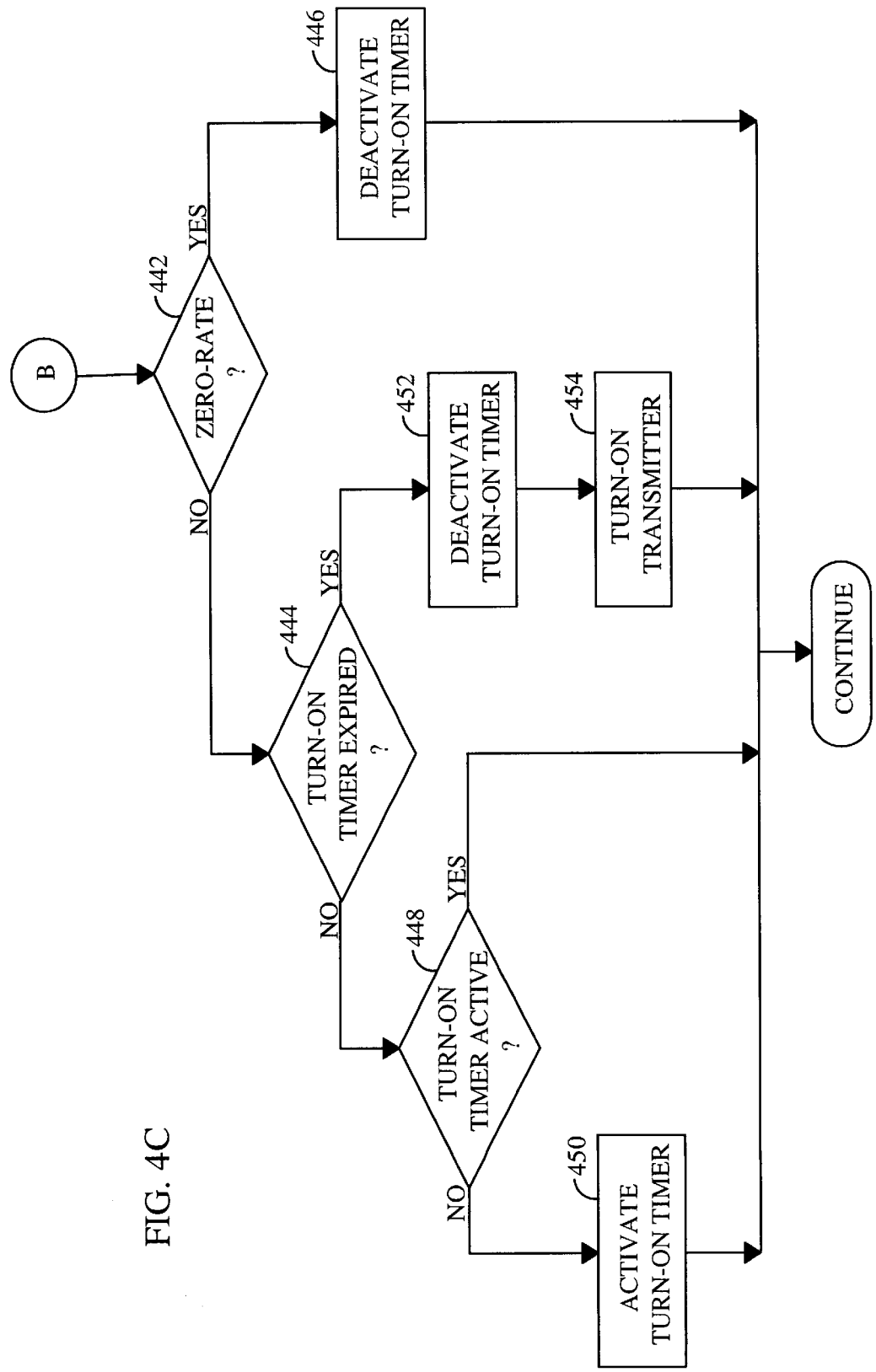

FIGS. 4a–4c are flowcharts of an exemplary process for supervising transmit power. When a connection is first established between an access terminal and a wireless network, the access terminal's transmitter is turned on and two timers in the access terminal referred to as a "Turn-Off Timer" and a "Turn-On Timer" begin in a deactivated state. During processing for each new time slot at step 402, the access terminal generates (at step 404) a DRC value and uses that DRC value along with the two timers to determine whether to turn on or turn off its transmitter.

In an exemplary embodiment, the step of generating a DRC value 404 is followed by inspecting whether the transmitter of the access terminal 110 is turned on or off 406. If the transmitter is on, the process proceeds as illustrated in FIG. 4b, where the access terminal determines whether the transmitter should be turned off. If the transmitter is off, the process proceeds as illustrated in FIG. 4c, where the access terminal determines whether the transmitter should be turned on.

In FIG. 4b, the process proceeds from step 406 to an evaluation at step 420 of the value of the DRC value generated at step 404. If, at step 420 the newly generated DRC value is greater than zero-rate, then the access terminal deactivates the "Turn-Off Timer" (at step 422). In an exemplary embodiment, deactivating the Turn-Off Timer when it is already deactivated results in no change in the state of the Turn-Off Timer. In an alternate embodiment, step 422 includes checking the state of the Turn-Off Timer and only deactivating it if it has previously been activated. After step 422, the process continues with the processing of the next time slot (402 in FIG. 4a).

If, at step 420 the newly generated DRC value was a zero-rate DRC value, then the access terminal evaluates the state of the Turn-Off Timer at step 424. If the Turn-Off Timer is active but has expired at step 424, then the access terminal deactivates its Turn-Off Timer at step 430 and turns off its transmitter at step 432. If the Turn-Off Timer has not expired at step 424, then the access terminal checks (at step 426) whether the Turn-Off Timer has already been activated. If at step 426 the Turn-Off Timer has not been activated, then the access terminal activates its Turn-Off Timer at step 428. Step 428 of activating the Turn-Off Timer includes setting the timer to expire after a specified Turn-Off Period, for example 240 milliseconds or 144 slots of duration 1.67 milliseconds. The expiration of the activated Turn-Off timer acts as a signal for the access terminal to turn off its transmitter. If at step 426 the Turn-Off Timer has already been activated, then the process continues with the processing of the next time slot (402 in FIG. 4a).

In FIG. 4c, the process proceeds from step 406 to an evaluation at step 442 of the value of the DRC value generated at step 404. If, at step 442 the newly generated DRC value was a zero-rate DRC value, then the access terminal deactivates the "Turn-On Timer" at step 446. In an exemplary embodiment, deactivating the Turn-On Timer when it is already deactivated results in no change in the state of the Turn-On Timer. In an alternate embodiment, step 446 includes checking the state of the Turn-On Timer and only deactivating it if it has previously been activated. After step 446, the process continues with the processing of the next time slot (402 in FIG. 4a).

If, at step 442 the newly generated DRC value was greater than zero-rate, then the access terminal evaluates the state of the Turn-On Timer at step 444. If the Turn-On Timer is active but has expired at step 444, then the access terminal deactivates its Turn-On Timer at step 452 and turns its transmitter back on at step 454. If the Turn-On Timer has not expired at step 444, then the access terminal checks (at step 448) whether the Turn-On Timer has already been activated if at step 448 the Turn-On Timer has not been activated, then the access terminal activates its Turn-On Timer at step 450. Step 450 of activating the Turn-On Timer includes setting the timer to expire after a specified Turn-On Period. In an exemplary embodiment, the Turn-On Period is approximately 13.33 milliseconds or 8 slots of duration 1.67 milliseconds. In an alternate embodiment, the Turn-On Period is approximately 26.67 milliseconds or 16 slots of duration 1.67 milliseconds. The expiration of the activated Turn-On timer acts as a signal for the access terminal to turn on its transmitter. If at step 448 the Turn-On Timer has already been activated, then the process continues with the processing of the next time slot (402 in FIG. 4*a*).

Figure 5A:
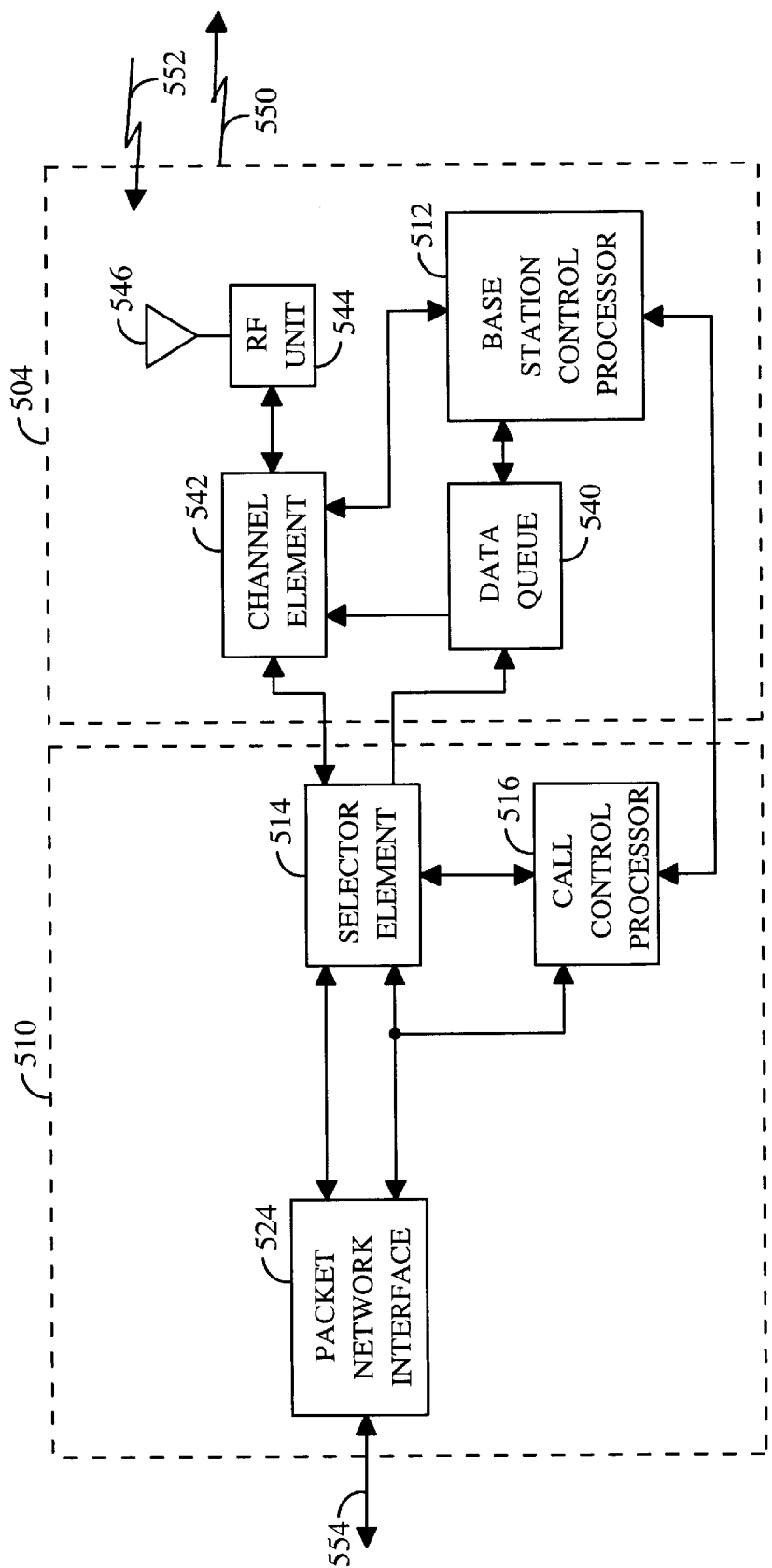
FIG. 5a is a block diagram of an exemplary high data rate wireless network, including a base station and a base station controller.

FIG. 5*a* is a block diagram illustrating the basic subsystems of an exemplary high data rate base station 504 and base station controller (BSC) 510 configured in accordance with one embodiment. BSC 510 and base station 504 may serve as components of a wireless network such as the wireless network 120 of FIG. 1. With reference also to FIG. 1, BSC 510 interfaces with packet data networks 124 and 126 through one or more packet network interfaces 524. Though only one base station 504 is shown for simplicity, wireless network 120 may contain multiple base stations 504 and base station controllers 510. BSC 510 coordinates the communications between each access terminal (110 from FIG. 1) and packet data network 126 through packet network interface 524. Wireless network 120 may also include an interworking function or IWF (not shown), disposed between selector elements 514 and the public switched telephone network or PSTN (not shown).

BSC 510 contains many selector elements 514, although only one is shown in FIG. 5*a* for simplicity. Each selector element 514 is assigned to control communications between one access terminal and BSC 510 through one or more base stations 504. In an exemplary embodiment, a connection between BSC 510 and an access terminal may comprise multiple traffic channels routed through a single selector element 514. An access terminal is allocated a maximum of one traffic channel from each serving base station 504. Data received from a single access terminal by each serving base station 504 is routed through the single selector element 514 assigned to the access terminal.

Packet network interface 524 receives data from packet data network 126 through connection 554, inspects the destination address of the packet data, and routes the data to the selector element 514 associated with the destination access terminal. If a connection has not been established between wireless network 120 and the destination access terminal, then call control processor 516 sets up a connection with the access terminal. Setting up a connection includes paging the access terminal and assigning a selector element 514 and one or more traffic channels to the access terminal. Each traffic channel assigned to a connection to a single access terminal will belong to a different base station. A base station 504 that communicates with an access terminal through a traffic channel is referred to as a "serving base station" of that access terminal. The selector element 514 assigned to an access terminal connection is used to transmit packet data received from packet network interface 524 to the serving base stations 504 of the destination access terminal.

In an exemplary embodiment, each base station 504 includes a base station control processor 512 that schedules forward link transmissions to all access terminals being served by the base station 504. Base station control processor 512 chooses the access terminal to which forward link transmissions will be directed for each forward link time slot.

In an exemplary embodiment, each base station 504 maintains a forward link data queue 540 for each traffic channel associated with an active access terminal. Packet data to be transmitted to the access terminal is stored in the forward link data queue associated with the access terminal until the base station control processor 512 selects that access terminal as the destination access terminal for a forward link time slot.

In an exemplary embodiment, base station 504 includes multiple channel elements 542, wherein one channel element 542 is allocated to each traffic channel. Once base station control processor 512 selects a destination access terminal for a forward link time slot, the data is transmitted from forward link data queue 540 through the corresponding channel element 542 to radio frequency (RF) unit 544, and then through antenna 546. The data then travels through forward link 550 to the access terminal.

In an exemplary embodiment, base station control processor 512 also specifies the transmit rate for each forward link time slot. Reverse link 552 carries reverse link signals, such as DRC information received from each access terminal 110 to antenna 546. The reverse link signals are then downconverted and gain-controlled in RF unit 544 and are demodulated and decoded in channel element 542.

In an exemplary embodiment, base station control processor 512 monitors the DRC information received from each active access terminal and uses the DRC information along with the amount of data in each forward link data queue 540 to schedule transmissions on the forward link 550. In an exemplary embodiment, base station control processor 512 generates a configuration packet that is periodically transmitted over forward link 550. The configuration packet includes traffic channel allocation information indicating whether each of the base station's traffic channels is allocated to an active access terminal. Call control processor 516 directs base station control processor 512 to release a traffic channel assigned to an active access terminal 110. Call control processor 516 generates a release initiate message and sends the message to the to-be-released access terminal through one or more base stations. If the selector element 514 assigned to the to-be-released access terminal does not receive a release message, then call control processor 516 directs the base station control processor 512 to update the contents of subsequent configuration packets transmitted to reflect the deallocation of the corresponding traffic channel. Call control processor 516 may thus specify the deallocation of traffic channels in one or all base stations serving the to-be-released access terminal.

Call control processor 516 and base station control processor 512 are implemented using microprocessors, field-programmable gate arrays (FPGA), programmable logic devices (PLD), digital signal processors (DSP), application specific integrated circuits (ASIC), or other devices capable of generating and adjusting the necessary amplitude and phase of control signals. In an exemplary embodiment, the communications between BSC 510 and base station 504 travel through a backhaul connection. The information flowing through the backhaul connection include communications between call control processor 516 and base station control processor 512. The backhaul connection between BSC 510 and base station 504 are implemented using appropriate connection equipment such as underground cabling or microwave T1 or T3 or optical fiber such as OC3.

In an exemplary embodiment, a release message received on reverse link 552 from the released access terminal is decoded and routed to base station control processor 512, which coordinates the reclaiming and reallocation of traffic channel resources such as a selector element 514 with call control processor 516. In an alternate embodiment, the release message is not decoded by base station control processor 512, but is routed through selector element 514 to call control processor 516. In an alternative embodiment, BSC 510 and base station 504 are integrated, and the functions of call control processor 516 and base station control processor 512 are performed by a single processor or by the same set of shared processors.

In an exemplary embodiment, data is transmitted on the forward link 550, in "data packets" having a minimum size of 1024 bits. The contents of a data packet are transmitted over one or more time slots having a fixed duration, for example 1.667 milliseconds.

In an exemplary embodiment, channel element 542 generates a cyclic redundancy check (CRC) for the packet and then encodes the data packet and its CRC using a forward error correction (FEC) code to form an encoded packet. The FEC code may utilize any of several forward error correction techniques, including turbo-coding, convolutional coding, block coding, or other forms of coding including soft decision coding. Channel element 542 then interleaves (or reorders) the symbols within the encoded packet. Channel element 542 may utilize any of a number of interleaving techniques, such as block interleaving and bit reversal interleaving. The interleaved packet is encoded using code division multiple access (CDMA) techniques, including covering the symbols with a Walsh code and PN spreading them using short PNI and PNQ codes. An alternate embodiment uses complex PN spreading. The spread data is provided to RF unit 544 which quadrature modulates, filters, and amplifies the signal. The forward link signal is then transmitted over the air through antenna 546 on forward link 550.

Figure 5B:
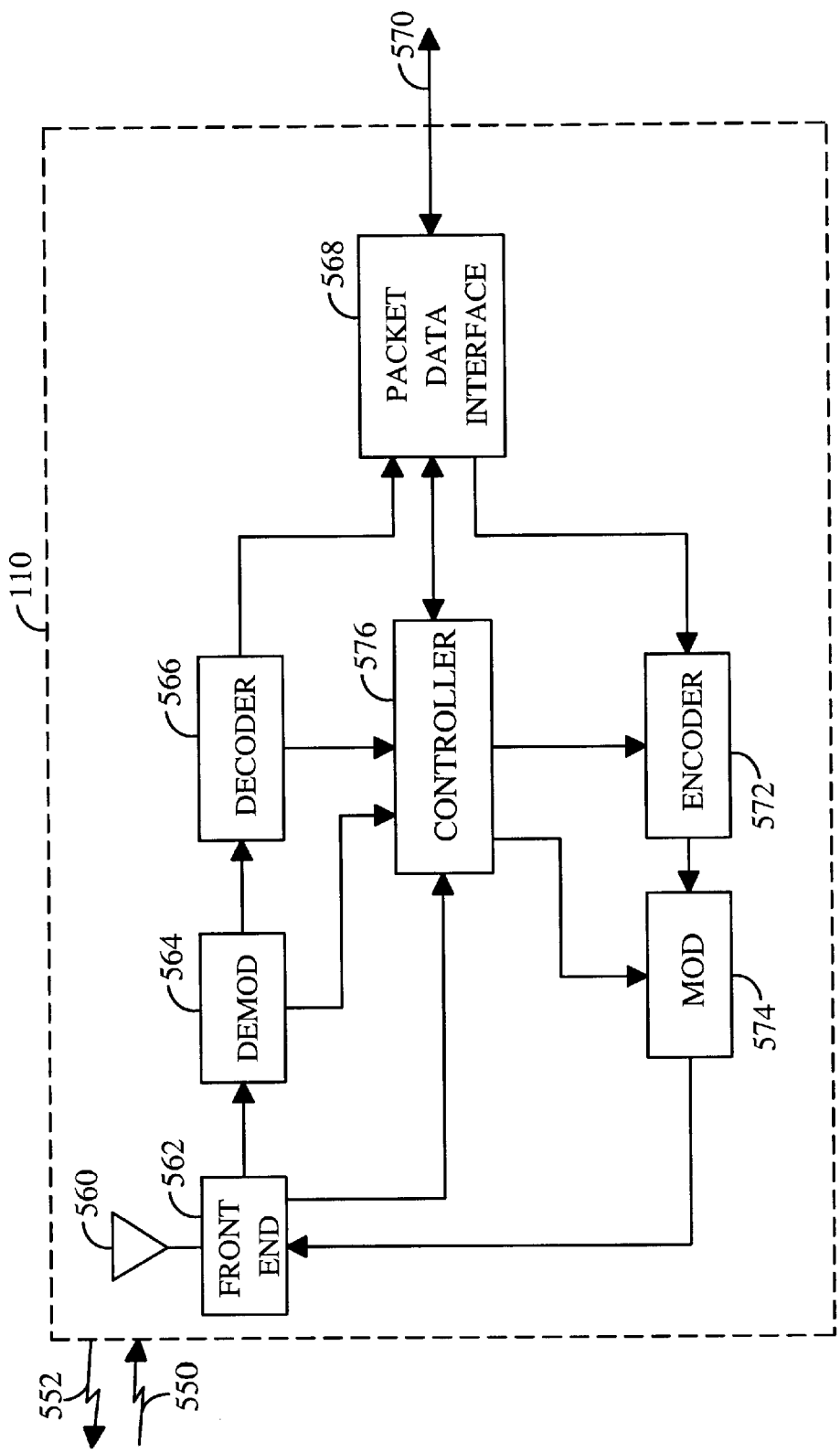
FIG. 5b is a block diagram of an exemplary high data rate access terminal.

FIG. 5b is a block diagram of an exemplary high data rate access terminal 110. The access terminal 110 transmits information, such as DRC information and reverse link packet data, to wireless network 120 through reverse link 552 of wireless communication channel 112. The access terminal 110 receives data from wireless network 120, such as forward link data and configuration packets, through forward link 550 of wireless communication channel 112.

In an exemplary embodiment, the forward link signal is received through antenna 560 and routed to a receiver within front end 562. The receiver filters, amplifies, quadrature demodulates, and quantizes the signal. The digitized signal is provided to demodulator (DEMOD) 564 where it is despread with the short PNI and PNQ codes and decovered with the Walsh cover. The demodulated data is provided to decoder 566 which performs the inverse of the transmit signal processing functions done at base station 504. Specifically, decoder 566 performs de-interleaving, decoding, and CRC check functions. The decoded packet data is provided to packet data interface 568, which then sends the data through connection 570 to an external device (not shown) having a user interface and running a user application such as a web browser. Decoder 566 provides decoded call control information, such as configuration packets and release initiate messages, to controller 576.

Data is received from the external device (not shown) through connection 570 and packet data interface 568. The data may be routed through controller 576 or packet data may be provided directly to encoder 572.

Controller 576 monitors properties of the signal received from the serving base station 504 and generates DRC information. Controller 576 provides the resultant DRC information to encoder 572 for subsequent transmission on the reverse link 552. Controller 576 also processes received release initiate messages and generates corresponding release messages to be transmitted. Controller 576 evaluates the contents of each decoded configuration packet to determine whether any of the access terminal's traffic channels has been deallocated.

As described above, controller 576 monitors the generated DRC levels so that access terminal 110 can avoid becoming an in-band jammer for the wireless network. In an exemplary embodiment, controller 576 causes the transmitter in front end 562 to turn off if the DRC level drops to zero-rate for a specified duration, for example 240 milliseconds or 144 time slots. Controller 576 turns the transmitter in front end 562 back on after the DRC rate stays above zero for a specified period, for example 8 consecutive time slots.

In an exemplary embodiment, packet data interface 568 includes data buffers for temporary storage of forward and reverse link data. While the transmitter in front end 562 is turned off, reverse link data is saved in the buffers until the transmitter is again turned on. In an alternate embodiment, data is sent to the transmitter even when the transmitter is off, resulting in its loss. The alternate embodiment avoids the possibility of a buffer overflow of reverse link data.

If controller 576 receives a release initiate message, then controller 576 generates a release message to be transmitted through encoder 572, modulator 574, front end 562 and antenna 560. After transmitting the release message, controller 576 releases its connection with the wireless network and all associated traffic channels.

If controller 576 receives a configuration packet that indicates that the one of the access terminal's traffic channels has been deallocated, then controller 576 immediately releases that traffic channel. In an exemplary embodiment, if only one of multiple traffic channels assigned to an access terminal has been deallocated, the access terminal optionally continues to use the remaining traffic channels of the connection. In an alternate embodiment, the deallocation of any of an access terminal's traffic channels causes the access terminal to release its entire connection with the BSC and all base stations.

In addition, controller 576 monitors the intervals between receipt of successfully decoded configuration packets. If controller 576 determines that no configuration packet has been successfully decoded for a period greater than or equal to the supervision time, then controller 576 releases its connection with the BSC and all base stations. In an exemplary embodiment, controller 576 is implemented using microprocessors, field-programmable gate arrays (FPGA), programmable logic devices (PLD), digital signal processors (DSP), application specific integrated circuits (ASIC), or other devices capable of performing the controller functions described herein.

In an exemplary embodiment, reverse link data from packet data interface 568 and controller 576 is encoded in encoder 572. Encoder 572 generates a cyclic redundancy check (CRC) for each packet and then encodes the data packet and its CRC using a forward error correction (FEC) code to form an encoded packet. The FEC code may utilize any of several forward error correction techniques, including turbo-coding, convolutional coding, block coding, or other forms of coding including soft decision coding. Modulator (MOD) 574 then interleaves (or reorders) the symbols within the encoded packet using any of a number of interleaving techniques, such as block interleaving and bit reversal interleaving. The interleaved packet is encoded using code division multiple access (CDMA) techniques, including covering the symbols with a Walsh code and PN spreading them using short PNI and PNQ codes. An alternate embodiment uses complex PN spreading. The spread data is provided to a transmitter in front end 562 which quadrature modulates, filters, and amplifies the signal. The reverse link signal is then transmitted over the air through antenna 560 on reverse link 552.

Alternate embodiments are applicable to other hardware architectures that can support variable rate transmissions. For example, an alternate embodiment applies to a system using optical fiber channels, wherein wireless communication channel 112 in FIG. 1 is replaced with an optical fiber communication channel and forward link 550 and reverse link 552 in FIGS. 5a–5b exist within the optical fiber. Antennas 560 and 546 in FIGS. 5a–5b are replaced with optical fiber interfaces.

Though described herein in terms of connection supervision on the forward link, an exemplary embodiment can be readily extended to cover connection supervision on the reverse link. Also, an exemplary embodiment uses code division multiple access (CDMA) techniques, but may be easily extended to employ different multiple access techniques such as time division multiple access (TDMA).

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a wireless communication system, a method for controlling transmission power comprising:
    measuring at least one first carrier-to-interference ratio of a received signal;
    generating a first measurement value for each of said at least one first carrier-to-interference ratio to form at least one first measurement value;
    transmitting the at least one first measurement value;
    measuring a second carrier-to-interference ratio of the received signal;
    generating a second measurement value for the second carrier-to-interference ratio; and
    turning off a transmitter based on the at least one first measurement value and the second measurement value.

2. The method of claim 1 wherein each of said at least one first measurement value is a data rate control (DRC) value, and wherein said second measurement value is a DRC value.

3. The method of claim 1 wherein said turning off a transmitter comprises:
    determining a first length of time during which none of the at least one first measurement value exceeded a first predetermined value; and
    turning off the transmitter when the first length of time is greater than or equal to a first predetermined period.

4. The method of claim 3 wherein the first predetermined period is approximately 240 milliseconds.

5. The method of claim 3 further comprising:
    measuring, while the transmitter has been turned off, at least one subsequent carrier-to-interference ratio of the received signal;
    generating a subsequent measurement value for each of said at least one subsequent carrier-to-interference ratio to form at least one subsequent measurement value;
    determining a second length of time during which each of the at least one subsequent measurement value exceeded a second predetermined value; and
    turning on the transmitter when the second length of time is greater than or equal to a second predetermined period.

6. The method of claim 5 wherein the second predetermined period is approximately 13 and one third milliseconds.

7. The method of claim 5 wherein the second predetermined period is approximately 26 and two thirds milliseconds.

8. The method of claim 5 wherein first predetermined value is equal to the second predetermined value.

9. The method of claim 5 wherein first predetermined value is equal to zero and the second predetermined value is equal to zero.

10. The method of claim 3 further comprising:
    measuring, while the transmitter has been turned off, at least one subsequent carrier-to-interference ratio of the received signal, wherein each of the at least one subsequent carrier-to-interference ratios corresponds to a time slot;
    generating a subsequent measurement value for each of said at least one subsequent carrier-to-interference ratio to form at least one subsequent measurement value; and
    turning on the transmitter when each of the at least one subsequent measurement value corresponding to a predetermined number of consecutive time slots exceeds a second predetermined value.

11. The method of claim 10 wherein the predetermined number is equal to eight.

12. The method of claim 10 wherein the predetermined number is equal to sixteen.

13. The method of claim 1 further comprising:
    measuring, while the transmitter has been turned off, at least one subsequent carrier-to-interference ratio of the received signal, wherein each of the at least one subsequent carrier-to-interference ratios corresponds to a time slot;
    generating a subsequent measurement value for each of said at least one subsequent carrier-to-interference ratio to form at least one subsequent measurement value; and
    turning on the transmitter when each of the at least one subsequent measurement value corresponding to a predetermined number of consecutive time slots exceeds a second predetermined value.

14. The method of claim 13 wherein the predetermined number is equal to eight.

15. The method of claim 13 wherein the predetermined number is equal to sixteen.

16. A wireless access terminal apparatus comprising:
    a transmitter for amplifying and transmitting a control signal at a transmit power level;
    a demodulator for demodulating a downconverted signal and measuring signal characteristics of the downconverted signal; and a control processor for generating measurement values based on the signal characteristics, and for setting the transmit power level to approximately zero based on the measurement values, wherein the transmitted control signal includes the measurement values.

17. The apparatus of claim 16 wherein said demodulator is further configured to generate the carrier-to-interference ratio measurements, and wherein the signal characteristics include the carrier-to-interference ratio measurements.

18. The apparatus of claim 16 wherein said control processor is further configured to determine a length of time during which none of the measurement values exceeded a predetermined value, and to set the transmit power level to approximately zero based on when the length of time is greater than or equal to a predetermined transmitter-off period.

19. The apparatus of claim 18 wherein said control processor is configured to use a transmitter-off period of approximately 240 milliseconds.

20. The apparatus of claim 16 wherein said control processor is further configured to determine the length of time during which all of the generated measurement values exceeded a predetermined value, and to set the transmit power level to a value other than approximately zero when the length of time is greater than or equal to a predetermined transmitter-on period.

21. The apparatus of claim 20 wherein said control processor is further configured to use a transmitter-on period of approximately 13 and one third milliseconds.

22. The apparatus of claim 20 wherein said control processor is further configured to use a transmitter-on period of approximately 26 and two thirds milliseconds.

23. The apparatus of claim 16 wherein said control processor is further configured to determine a consecutive number of time slots during which all of the generated measurement values exceeded a predetermined value, and to set the transmit power level to a value other than approximately zero when the number of time slots is greater than or equal to a predetermined number of slots.

24. The apparatus of claim 23 wherein said control processor is further configured to use a predetermined number of slots equal to eight.

25. The apparatus of claim 23 wherein said control processor is further configured to use a predetermined number of slots equal to sixteen.

26. A wireless access terminal apparatus comprising:
means for measuring at least one first carrier-to-interference ratio of a received signal;
means for generating a first measurement value for each of said at least one first carrier-to-interference ratio to form at least one first measurement value;
means for transmitting the at least one first measurement value;
means for measuring a second carrier-to-interference ratio of the received signal;
means for generating a second measurement value for the second carrier-to-interference ratio; and
means for turning off a transmitter based on the at least one first measurement value and the second measurement value.

27. The apparatus of claim 26 further comprising:
means for measuring, while the transmitter has been turned off, at least one subsequent carrier-to-interference ratio of the received signal;
means for generating a subsequent measurement value for each of said at least one subsequent carrier-to-interference ratio to form at least one subsequent measurement value;
means for determining a first length of time during which each of the at least one subsequent measurement value exceeded a first predetermined value; and
means for turning on the transmitter when the first length of time is greater than or equal to a first predetermined period.

* * * * *